G. WINDLE.
Hand-Planters.

No. 136,294.

Patented Feb. 25, 1873.

Witnesses:

Inventor:
Gabriel Windle
By Johnson, Klaucke & Co.
his Attorneys

UNITED STATES PATENT OFFICE.

GABRIEL WINDLE, OF NEW CAMBRIA, MISSOURI, ASSIGNOR OF ONE-HALF HIS RIGHT TO NORMAN N. DAVIS, OF SAME PLACE.

IMPROVEMENT IN HAND-PLANTERS.

Specification forming part of Letters Patent No. 136,294, dated February 25, 1873.

*To all whom it may concern:*

Be it known that I, GABRIEL WINDLE, of New Cambria, in the county of Macon and State of Missouri, have invented certain new and useful Improvements in Hand Seed-Planters, of which the following is a specification:

My invention relates to devices for planting seed by hand in which the ground is penetrated and the seed deposited by the withdrawal of the device therefrom; and the improvements which I have made consist of a short hinged board, with its upper end arranged to move beneath the feeding-slide, and having a curved handle by which to operate it and the slide, whereby the advantages of compactness, lightness, and economy of construction are obtained, and the grasping-handles rendered convenient for use. Also, in combining with a short hinged jaw-board, arranged to move beneath feed-slide, stops to limit the opening and closing movement of the penetrating-jaws and relieve their sharp edges from being bent under the pressure in closing them together, as heretofore; and by this means maintain a close joint when the penetrating-edges are brought together. Also, in the combination and arrangement of the several parts of the planter for operation, as will be more fully hereinafter set forth.

Figure 1:
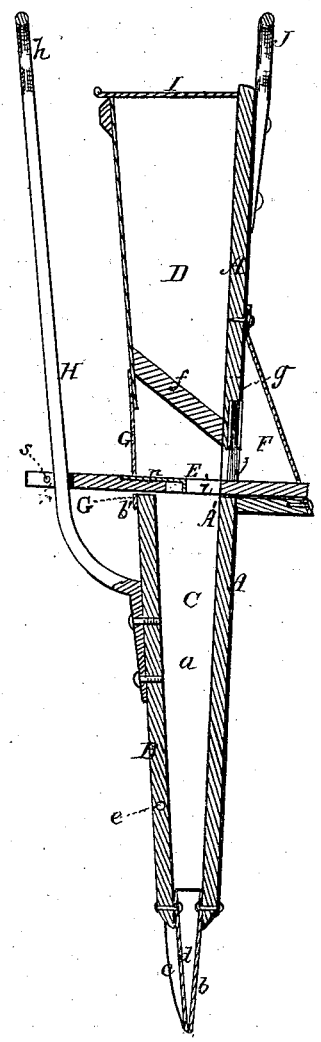
Figure 2:
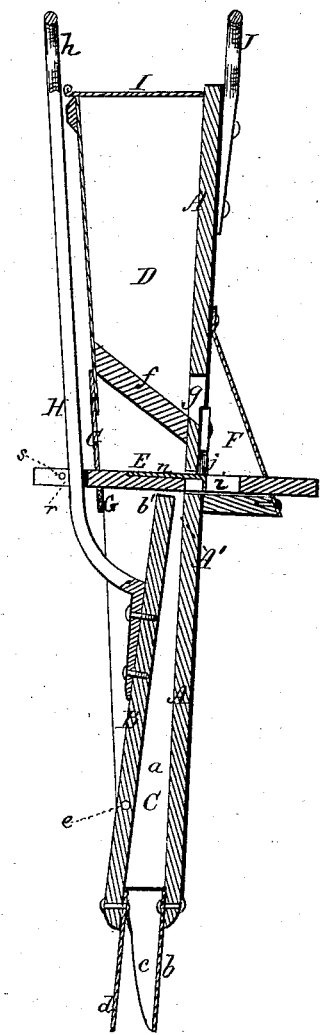
Figure 3:
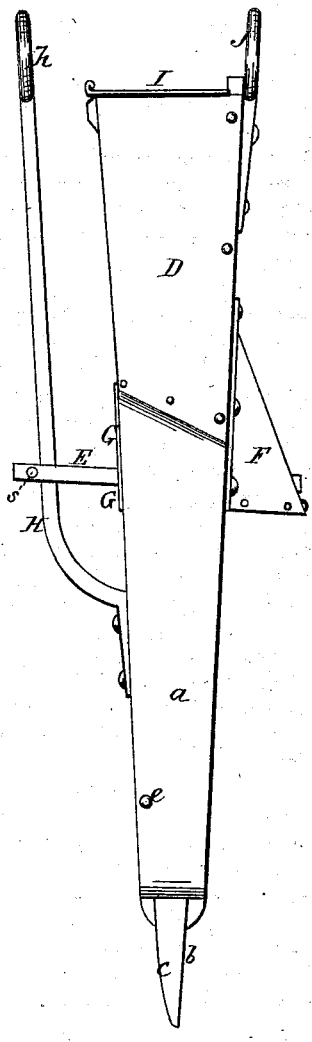

In the accompanying drawing, Figure 1 represents a vertical section of my improved hand-planting device, showing the depositing-jaws closed to penetrate the soil. Fig. 2 represents a similar section, showing the jaws open to deposit the seed; and Fig. 3, a side elevation of the same.

The device consists of a board, A, of suitable dimensions, to the lower portion of which are secured two side strips, $a$, of about half its length; and near the lower ends of which is pivoted a movable board, B, so as to form an interior receiving and conducting chamber, C, for the grain. A metal plate, $b$, is secured to the lower end of the board A, provided with the side flanges $c$ to penetrate the soil, and keep the jaws from choking; and the pivoted board B is also provided with a metal plate, $d$, which fits between the flanges $c$, and forms, with the plate $b$, an opening-and-closing jaw. The pivot $e$ of the board B is arranged at a suitable point above the penetrating-plates $b\ d$, to allow its upper end to move beneath the hopper D and beneath the slide E, thus obtaining a compact and economical arrangement. To the upper portion of this box the hopper D is secured, which consists of a piece of sheet-iron secured to the board A so as to form an inclosed hopper, the bottom $f$ of which inclines upward from said board A a short distance above the feeding-slide E, thus separating it from the slide. A small chamber, F, is secured to the outer side of the board A, which is provided with two openings, $g$, which form a communication between the small side chamber F and the seed-hopper D, from which the seed passes, so as to keep the side chamber F filled, and thus form a supplemental receptacle to the grain-hopper, from which the slide receives the grain and deposits it in the conducting-chamber C of the planting-box, thereby relieving the slide E from feeding directly from the main hopper D, and of the weight of the grain therein, and allowing it to feed only from the side supply-chamber. The slide E, therefore, is arranged to pass through an opening in the board A, and the supplemental chamber F, the latter being provided with an opening for that purpose just above the floor, which forms a guide for that end of the slide, and an opening in a plate, G, on the opposite side of the box, which forms a guide for that end of the slide connected with the operating-handle. The board A, between its feed-openings $g$ and just above the feeding-opening $i$ of the slide E, is provided with bristles $j$ outside of the seed-hopper D and within the supplemental chamber F, for the purpose of allowing the slide E to feed only so much seed as its opening will contain. The opening $i$ in the slide E is provided with the usual adjusting-plate $n$ for increasing or diminishing the area of said feed-opening, according to the size of the grain to be planted; and the bristles $j$, which are secured flush with the board A, can be adjusted vertically to the slide as they wear. The slide E is arranged between the upper end of the short hinged side board B and the inclined bottom $f$ of the hopper, and is connected to said hinged board by means of a bent rod, H, the upper end of which forms the handle $h$, by which to operate the slide; the bend of the connecting-rod H being at its junction with the hinged side B, to allow the upper end $b'$ of the latter to move freely from one side of the seed-conducting chamber C to the other, limited by the stop G and the inner side $A'$ of the jaw-board A, and thus prevent the bending of the thin sharp edges $b\ d$ of the penetrating-plates. The attachment of the slide to the operating-handle is made by a slot, $r$, in the end of the slide E, within which it is held by a pin, $s$, thus allowing the slide E to be easily moved from and inserted in place.

The seed-hopper is provided with a cover, I, and the device is manipulated by means of the fixed and movable handles J and $h$ at the top of the hopper.

Having described my invention, I claim—

1. The end $b'$ of the short hinged board B, arranged to move beneath the feeding-slide E, and having the curved handle H $h$ attached thereto below the feeding-slide E, as described, to obtain the advantages stated.

2. The short hinged side board B $b'$, in combination with the curved handle H and stops G and $A'$, as and for the purpose described.

GABRIEL WINDLE.

Witnesses:
OWEN W. JONES,
M. P. JONES.